(12) United States Patent
Hane et al.

(10) Patent No.: US 7,421,725 B2
(45) Date of Patent: Sep. 2, 2008

(54) METHOD OF AND SYSTEM FOR RECOMMENDING PROGRAMS

(75) Inventors: Hidetaka Hane, Tokyo (JP); Shinichiro Kamei, Tokyo (JP)

(73) Assignee: NEC Corporation, Tokyo (JP)

( * ) Notice: Subject to any disclaimer, the term of this patent is extended or adjusted under 35 U.S.C. 154(b) by 1406 days.

(21) Appl. No.: 10/124,476

(22) Filed: Apr. 18, 2002

(65) Prior Publication Data

US 2002/0157096 A1 Oct. 24, 2002

(30) Foreign Application Priority Data

Apr. 23, 2001 (JP) .............................. 2001-124585

(51) Int. Cl.
*H04N 5/445* (2006.01)
(52) U.S. Cl. ...................................................... 725/46
(58) Field of Classification Search .................... 725/46
See application file for complete search history.

(56) References Cited

U.S. PATENT DOCUMENTS

| 6,581,207 | B1 * | 6/2003 | Sumita et al. ................. 725/46 |
| 6,851,090 | B1 * | 2/2005 | Gutta et al. ................. 715/716 |
| 6,898,762 | B2 * | 5/2005 | Ellis et al. ................. 715/716 |
| 2002/0100046 | A1 * | 7/2002 | Dudkiewicz ................. 725/46 |
| 2002/0199194 | A1 * | 12/2002 | Ali ............................. 725/46 |

FOREIGN PATENT DOCUMENTS

| GB | 2 343 076 | 4/2000 |
| JP | 6-140952 | 5/1994 |
| JP | 07-135621 | 5/1995 |
| JP | 10-207914 | 8/1998 |
| WO | WO 01/20904 | 3/2001 |

* cited by examiner

*Primary Examiner*—Christopher Grant
*Assistant Examiner*—Oschta Montoya
(74) *Attorney, Agent, or Firm*—Young & Thompson

(57) ABSTRACT

Television programs are recommended in a flexible manner which a conventional keyword learning process has failed and also recommended with high accuracy. A method of recommending a program in an apparatus which receives broadcasts of programs together with information representing contents of the programs is carried out by generating a user profile having a plurality of themes with numerical values assigned thereto for representing preferred programs of the user, classifying themes by assigning numerical values to a plurality of respective themes with respect to each of a plurality of programs, using theme dictionaries containing keywords given to the themes, and determining programs to be recommended from the user profile and the numerical values assigned to the themes with respect to each of the programs.

14 Claims, 8 Drawing Sheets

Fig.3

| program titles | broadcasting time | channels | performers | genres | program explanation |
|---|---|---|---|---|---|
| 7pm news | August 10 19:00-19:30 | 1 MHK | | news | primeminister Hayashi retirement△ △is there some sign of an economic recovery△tomorrows weather |
| science special "mars" | August 10 20:00-22:00 | 3 Education | | science | Explains a mars probe robot gathers the best that advanced modern technology. Investigate existence of life and water in the past |
| travel "kusatsu" | August 10 20:00-21:00 | 4 XTV | Yasuko Kojima Hiroshu Tanaka | travel | Introduce open-air bath of popular inn. Visit the Japanese Romantic highway with red leaves in full. Smacking lips over the "Kaiseki" of Japanese style inn |
| 141 | 142 | 143 | 144 | 145 | 146 |

Fig.4

| | 1 MHK | 3 Education | 4 XTV |
|---|---|---|---|
| 19 | 7PM news | Health "Lumbago" | Travel "Kusatsu" |
| | focus | Human | |
| 20 | Quiz "The Match" Kennichi Yamada Sachiko Kitamura | Science Special "Mars" | World History "Investigate the history of Egypt" |
| 21 | MHK special "IT Revolution" | | Movie:"Bridge to the Future" John Smith Robert Show |

161 (top-left), 162 (top-right)

Fig.5

| | theme (151) | contains keywords (152) |
|---|---|---|
| 153 | travel | inn, hotel, train tour, sea voyage, highway |
| 154 | spa | secluted hot spring, open-air bath, hot spring, steam |
| 155 | cooking | Kaiseki, French, Italian |
| 156 | science | robot, scientist, technology, sun, earth, mars |
| 157 | information-oriented | internet, robot, personal computer |
| 158 | nature | earth, water, green, red leaves |

| program title | theme | point |
|---|---|---|
| Science Special "Mars" | science | 3 |
| | information -oriented | 1 |
| | nature | 1 |
| Travel "Kusatsu" | travel | 3 |
| | spa | 1 |
| | cooking | 1 |
| | nature | 1 |

Fig.10

| theme | point |
|---|---|
| science | 3 |
| information-oriented | 1 |
| nature | 2 |
| travel | 3 |
| spa | 1 |
| cooking | 1 |

Fig.11

| program (title) | theme | point |
|---|---|---|
| science "earth" | science | 2 |
| | nature | 1 |

METHOD OF AND SYSTEM FOR RECOMMENDING PROGRAMS

BACKGROUND OF THE INVENTION

1. Field of the Invention

The present invention relates to a method of and a system for recommending television programs that meet user's taste based on information representing the contents of television programs.

2. Description of the Related Art

There have heretofore been known systems for judging user's taste for television programs based on user's manual control actions made for viewing television programs, and recommending television programs based on the user's taste using text information of an EPG (Electronic Program Guide). For example, Japanese laid-open patent publication No. 7-135621 discloses a system which takes into account keywords by breaking up EPG text information of television programs preferred by the user and determining the frequency of appearance of keywords.

With the disclosed system, since keywords that appear frequently may not necessarily be characteristic keywords, the user may find an unexpected television program recommended by the system.

The disclosed system may not handle general nouns well. For example, the word "case" may appear in both the EPG text of a news program and the EPG text of a suspense drama. However, a news program and a suspense drama are clearly different from each other from the standpoint of people's taste. If only the keyword "case" is simply included in a user profile, then it contributes equally to the levels of recommendation for the television programs that are completely different in nature from each other.

The disclosed system only recommends those television programs which have keywords of high points, and fails to recommend television programs containing other keywords that human beings are able to guess with ease.

SUMMARY OF THE INVENTION

It is therefore an object of the present invention to provide a method of and a system for recommending television programs in a flexible manner which a conventional keyword learning process has failed and also for recommending television programs with high accuracy.

According to the present invention, there is provided a method of recommending a program in an apparatus which receives broadcasts of programs together with information representing contents of the programs, comprising the steps of generating a user profile having a plurality of themes with numerical values assigned thereto for representing preferred programs of the user, classifying themes by assigning numerical values to a plurality of respective themes with respect to each of a plurality of programs, using theme dictionaries containing keywords given to the themes, and determining programs to be recommended from the user profile and the numerical values assigned to the themes with respect to each of the programs.

The user profile may be generated by classifying themes with respect to programs which have been preset in the past for timer recording by the user or programs which have been specified as preferred programs by the user.

Themes may be classified for generating the user profile, using unique numbers of keywords in the theme dictionaries contained in the information representing the contents of the programs, as points in the themes of the programs.

Themes may be classified for generating the user profile, using the total numbers of keywords in the theme dictionaries contained in the information representing contents of the programs, as points in the themes of the programs.

Numerical values assigned to themes in the user profiles may be added to the numerical values assigned to the corresponding themes of the programs, and the sum may be used as a level of recommendation.

The method may further comprise the step of displaying a list of recommended programs together with the titles of themes most contributed to the recommendation of the programs.

The method may further comprise the step of individually generating a user profile of each of a plurality of users.

In the method, the information representing contents of the programs may comprise EPG data.

According to the present invention, there is also provided a system for recommending a program in an apparatus which receives broadcasts of programs together with information representing contents of the programs, comprising user's taste learning means for generating a user profile having a plurality of themes with numerical values assigned thereto for representing preferred programs of the user, and classifying themes by assigning numerical values to a plurality of respective themes with respect to each of a plurality of programs, using theme dictionaries containing keywords given to the themes, and recommended program determining means for determining programs to be recommended from the user profile and the numerical values assigned to the themes with respect to each of the programs.

The user's taste learning means may generate the user profile by classifying themes with respect to programs which have been preset in the past for timer recording by the user or programs which have been specified as preferred programs by the user.

In the system, themes may be classified for generating the user profile with the user's taste learning means, using unique numbers of keywords in the theme dictionaries contained in the information representing the contents of the programs, as points in the themes of the programs.

In the system, themes may be classified for generating the user profile with the user's taste learning means, using the total numbers of keywords in the theme dictionaries contained in the information representing contents of the programs, as points in the themes of the programs.

The recommended program determining means may add numerical values assigned to themes in the user profiles to the numerical values assigned to the corresponding themes of the programs, and may use the sum as a level of recommendation.

The recommended program determining means may display a list of recommended programs together with the titles of themes most contributed to the recommendation of the programs.

The user's taste learning means may individually generate a user profile of each of a plurality of users.

In the system, the information representing contents of the programs may comprise EPG data.

The above and other objects, features, and advantages of the present invention will become apparent from the following description with reference to the accompanying drawings which illustrate examples of the present invention.

BRIEF DESCRIPTION OF THE DRAWINGS

FIG. 3 is a diagram showing an example of EPG data;

FIG. 4 is a diagram showing an example of program table data;

FIG. 5 is a diagram showing an example of theme dictionary data;

FIG. 10 is a diagram showing an example of a user profile obtained by a user taste learning process;

FIG. 11 is a diagram showing an example of theme points which a television program has;

DETAILED DESCRIPTION OF THE PREFERRED EMBODIMENTS

Figure 1:
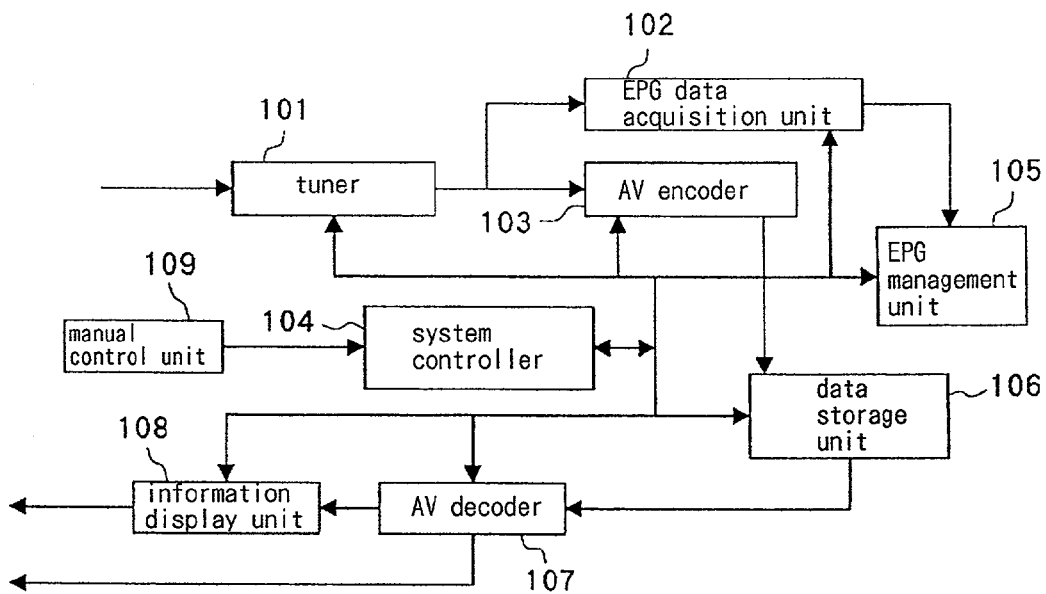
FIG. 1 is a block diagram of a program recommending system according to an embodiment of the present invention.

FIG. 1 shows in block form a program recommending system according to an embodiment of the present invention.

In the present embodiment, EPG (Electronic Program Guide) data representing an electronic television program table, which are transmitted by a data broadcasting service in a digital satellite multichannel broadcasting system, are used as information representing the contents of television programs as a text. The user of the digital satellite multichannel broadcasting system uses the EPG data displayed on the display screen of a television receiver to look for television programs that the user prefers. The program recommending system according to the embodiment of the present invention operates to recommend television programs that meet user's taste based on the EPG data. While the program recommending system relies on the EPG data for recommending television programs for the user in the present embodiment, the program recommending system is not limited to the use of the EPG data, but may also use any information which represents the contents of television programs as a text insofar as the information is broadcast with television programs.

The program recommending system shown in FIG. 1 has a function to store video and audio data of received television broadcasts in selected channels as digital AV data, so that television programs can be recorded and played back, and also to acquire, manage, and store EPG data contained in broadcast waves for displaying recommended television programs.

The program recommending system shown in FIG. 1 includes components required to reduce the present invention to practice, and is installed in a television receiver. Actually, the program recommending system also includes general components, such as a display tube or the like, which make up the television receiver itself.

The program recommending system comprises tuner 101, EPG data acquisition unit 102, AV encoder 103, system controller 104, EPG management unit 105, data storage unit 106, AV decoder 107, information display unit 108, and manual control unit 109. System controller 104 controls the various components of the program recommending system in response to user's manual control actions entered from manual control unit 109. Operation of the various components, described below, of the program recommending system is controlled by system controller 104.

Operation of the components, illustrated as blocks in FIG. 1, will be described below.

Tuner 101 selects a desired channel from television broadcast waves that are received through an antenna (not shown) connected thereto. The broadcast data in the selected channel is supplied from tuner 101 to EPG data acquisition unit 102 and AV encoder 103. EPG data acquisition unit 102 extracts EPG data from the broadcast data. EPG data may be inserted in television broadcast waves according to a known VBI (Vertical Blanking Interleave) process which inserts the data into the vertical synchronizing signal of an analog television signal.

The EPG data extracted by EPG data acquisition unit 102 is supplied to EPG management unit 105, which stores and manages the EPG data. EPG management unit 105 may comprise a RAM which can directly be accessed by a CPU (not shown) in system controller 104, or a secondary storage device such as a hard disk drive.

Video and audio signals of the broadcast data supplied from tuner 101 to AV encoder 103 are converted into digital AV data by AV encoder 103. The digital AV data are then stored in data storage unit 106 as a secondary storage device. The digital AV data may be in a format such as MPEG2 or the like, and is not limited to any particular format.

For playing back a recorded television program, stored data in data storage unit 106 are read by AV decoder 107, which decodes the data into video and audio signals. The video signal is input from AV decoder 107 to information display unit 108, which generates a user interface view for the user based on the EPG data from EPG management unit 105, generates a video image based on the video signal, with the user interface view superimposed thereon, and outputs the video image as a final video image.

Manual control unit 109 accepts manual control actions from the user, and comprises an infrared remote controller separate from television receiver, and an infrared detector and panel switches which are mounted on the television receiver.

In the present embodiment to be described below, the video and audio signals of television programs are compressed into digital data and stored in the data storage unit. However, it is possible to record the video and audio signals of television programs as analog data on video tapes exemplified by VHS tapes. While the program recommending system according to the present invention is to handle analog television broadcast waves in the embodiment, it can also handle digital television broadcast waves which will be expected to be put into service in the future.

The program recommending system according to the present invention expects EPG data to be included in television broadcast waves. However, the program recommending system may acquire EPG data from a communication medium such as the Internet different from television broadcast waves.

Figure 2:
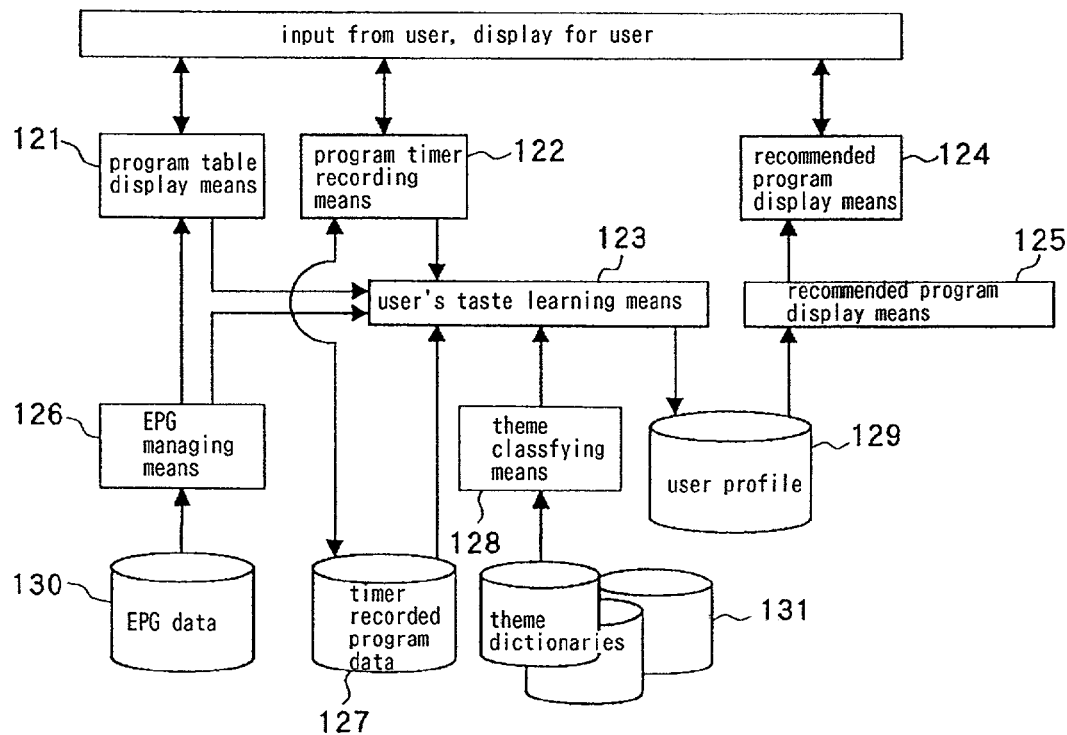
FIG. 2 is a block diagram illustrating the manner in which the program recommending system shown in FIG. 1 operates to determine a recommended program and display the recommended program.

FIG. 2 shows in block form the manner in which the program recommending system shown in FIG. 1 operates to determine a recommended program and display the recommended program. The program recommending system operates according to a predetermined program under the control of system controller 104. FIG. 2 shows those functional components which are required to execute the program, including files generated when the program is executed.

As shown in FIG. 2, the functional components of the program include program table display means 121, program timer recording means 122, user's taste learning means 123, recommended program display means 124, recommended program determining means 125, EPG managing means 126, timer recorded program data 127, theme classifying means 128, user profile 129, EPG data 130, and theme dictionaries 131.

User's taste learning means 123, recommended program determining means 125, and theme classifying means 128 correspond to system controller 104 shown in FIG. 1, and EPG managing means 126 corresponds to EPG management unit 105 shown in FIG. 1. Program table display means 121 and recommended program display means 124 correspond to information display unit 108 shown in FIG. 1, and program timer recording means 122 corresponds to manual control unit 109 shown in FIG. 1. Timer recorded program data 127, user profile 129, and theme dictionaries 131 are constructed in data storage unit 106 shown in FIG. 1.

A processing sequence of the program recommending system will briefly be described below with reference to FIG. 2.

Program table display means 121 displays a program table based on EPG data managed by EPG managing means 126. The user presets a program for timer recording or specifies a preferred program based on the displayed program table, using program timer recording means 122. The program preset for timer recording is assumed to be a program preferred by the user. User's taste learning means 123 recognizes the specified program or the program preset for timer recording as a program preferred by the user, obtains program information based on the EPG data for the preferred program from EPG managing means 126, and calculates a point for the program using theme classifying means 128.

In the present embodiment, points for a program are given to predetermined themes. A theme is a concept which characteristically represents the contents of a program. Theme dictionaries 131 contain themes and keywords belonging to those themes. For example, keywords "secluded hot spring" and "open-air bath" are assigned to a theme "spa", and used as elements of a theme dictionary about "spa". Theme classifying means 128 checks the keywords in theme dictionaries 131 prepared for respective themes against program information based on the EPG data, and calculates points for each of the programs depending on how the keywords match the program information.

User's taste learning means 123 generates user profile 129 representing the user's taste of the preferred program based on the sum of points, thus calculated, of the themes in the preferred program.

Program recommending means 125 determines a recommended program, and calculates a level of recommendation using points of the themes in each of programs and user profile 129. It is assumed that the higher the level of recommendation for a program, the more preferred the program is. Recommended program display means 124 displays program titles in the descending order of levels of recommendation.

Operation of theme classifying means 128 which constitutes a feature of the present invention will be described below.

As described above, a theme is a concept which characteristically represents the contents of a program. As shown in FIG. 4, a general program table contains program titles and performer's names in different time zones 161 and different channels 162. As shown in FIG. 3, EPG data are made up of program titles 141, broadcasting times 142, channels 143, performers 144, genres 145, and program explanations 146. The information in genres 145 directly represents the contents of programs. Genres do not divide the contents of a program into smaller segments, and only ten through several tens of genres are available. However, themes according to the present invention serve to divide the contents of a program into smaller segments, and several hundred themes are available.

For classifying programs according to themes, the program recommending system uses theme dictionaries 131 of keywords belonging to certain themes. FIG. 5 shows an example of theme dictionary data. For example, theme "travel" 153 contains keywords 152 including "inn", "hotel", "train tour", "sea voyage", and "highway". The basic idea of theme classification in that when a certain character string is given, the number of dictionary keywords of a theme contained in the character string is counted and classified as a degree related to the theme. Dictionary keywords of a theme may overlap those of a different theme. In the example shown in FIG. 5, both theme "science" 156 and theme "nature" 158 contain a keyword "earth".

Figures 6, 7:
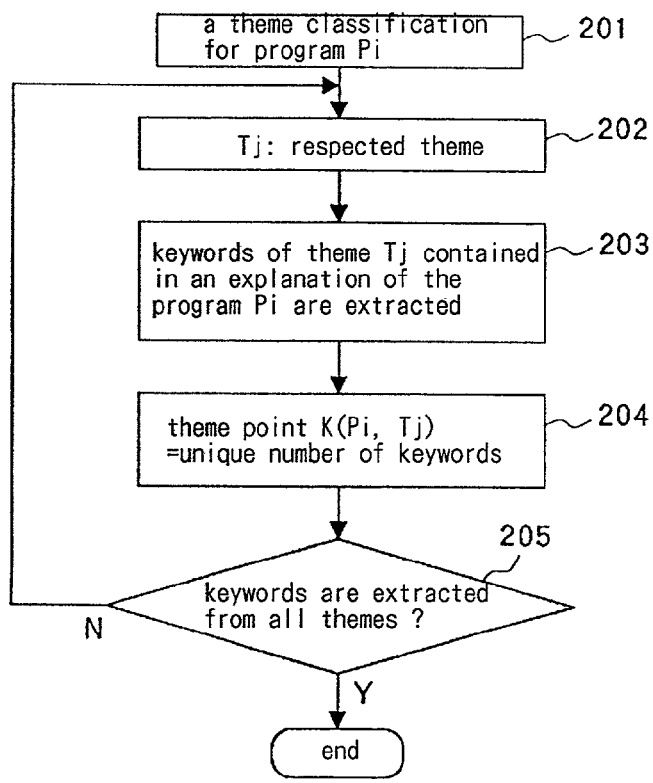
FIG. 6 is a diagram showing an example of table data obtained by a theme classification process.
FIG. 7 is a flowchart of a processing sequence of the theme classification process.

Based on the above concept of themes, theme classifying means 128 analyzes EPG data of a program, and calculates points of the themes of the program. FIG. 7 shows a processing sequence of a theme classification process for a certain program Pi.

In FIG. 7, a theme Tj of the program Pi is set to be processed in steps 201, 202. Using the theme dictionary of the theme Tj, keywords contained in an explanation of the program Pi are extracted in step S203. The keywords may be extracted according to a simple character string matching process or a morphemic analyzing process which is widely used for sentence analysis. The latter process is capable of extracting keywords more accurately than the former process.

Then, a unique number with respect to each of the keywords is determined as a theme point K (Pi, Tj) for the program Pi and the theme Tj in step S204. If the keyword is not contained, then the theme point K (Pi, Tj) is set to 0. The unique number of a keyword is a count representing that keyword even if it is extracted a plurality of times, the count being 1, not the number of times that it is extracted. Rather than using the unique number as the theme point, the total number of times that the keyword is counted may be used as a theme point. One of these processes may be selected depending on the tendency of the document to be processed or the tendency of the theme dictionary.

It is confirmed whether keywords are extracted from all the themes or not in step S205. If not extracted, then steps 202 through 204 are repeated. If extracted, then the processing sequence shown in FIG. 7 is put to an end. In this manner, the themes of the program Pi and their points are calculated as a table.

FIG. 6 shows an example of table data obtained by the theme classification process. In FIG. 6, programs entitled "Science special 'Mars'" and "Travel 'Kusatsu'" shown in FIG. 3 are classified into themes. The explanation of the former program contains keywords "robot", "technology", and "Mars" for the theme "science", and hence the point of the theme "science" is "3". The explanation of the former program contains a keyword "robot" for the theme "information-oriented", and hence the point of the theme "information-oriented" is "1". The explanation of the former program contains a keyword "water" for the theme "nature", and hence the point of the theme "nature" is "1". With respect to the program entitled "Travel 'Kusatsu'", the points of the respective themes are calculated as shown in FIG. 6.

A processing sequence of user's taste learning means 123 for learning user's taste will be described below.

User's taste learning means 123 is supplied with a program which is specified as a preferred program by the user and a program which is preset for timer recording, as programs preferred by the user, based on the program table displayed by program table display means 121, used with program timer recording means 122. User's taste learning means 123 classifies themes with respect to these preferred programs, learns user's taste based on the themes, and stores the user's taste in user profile 129.

Figure 8:
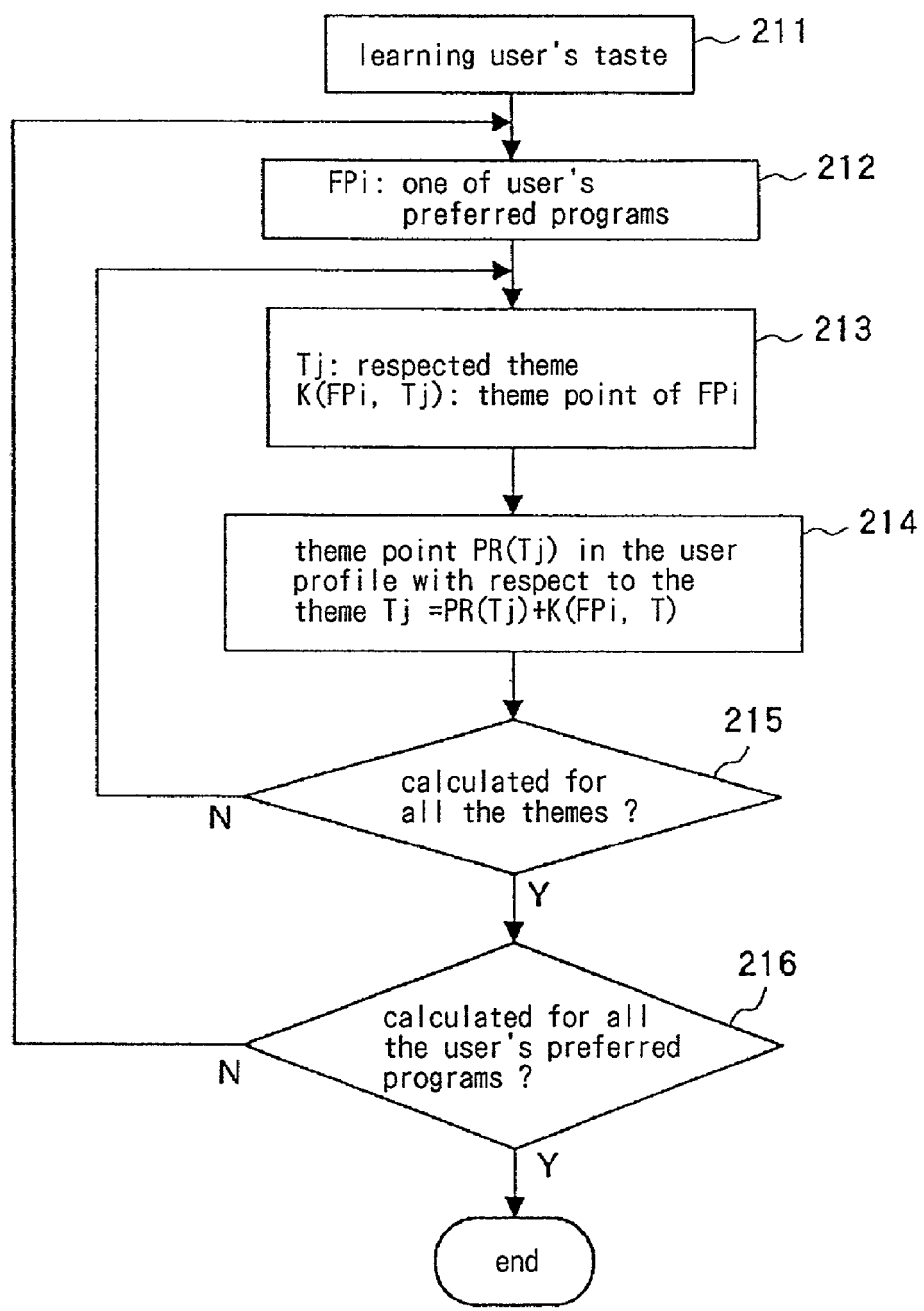
FIG. 8 is a flowchart of a processing sequence carried out by a user taste learning means.

FIG. 8 shows a processing sequence carried out by user's taste learning means 123.

First, a user's taste learning process is set and a user profile is set to be processed with respect to a program FPi which is one of user's preferred programs in steps 211, 212.

Then, a theme point K (FPi, Tj) of a theme Tj with respect to the user's preferred program FPi is calculated by theme classifying means 128 in step 213. The calculated theme point K (FPi, Tj) is added to a theme point PR (Tj) in the user profile with respect to the theme Tj in step 214. The theme point PR (Tj) has an initial value 0.

It is confirmed whether the theme point K (FPi, Tj) is calculated for all the themes or not in step 215. If not calculated, then steps 213 through 214 are repeated. If calculated, then it is confirmed whether the theme point K (FPi, Tj) is calculated for all the user's preferred programs in step 216. If not calculated, then steps 212 through 216 are repeated. If calculated, then the processing sequence is ended.

In the theme classification process carried out for generating a user profile, the unique number of an extracted keyword may be used as the theme point or the total number of times that an extracted keyword is counted may be used as the theme point, as with the theme classification process with respect to programs. One of these processes may be selected depending on the tendency of the document to be processed or the tendency of the theme dictionary.

The theme point may be divided by a number depending on the number of user's preferred programs to provide average data. For example, the theme point is divided by 2 if the number of user's preferred programs is 20, and 3 if the number of user's preferred programs is 30.

A user profile may be generated individually with respect to each of a plurality of users. A user profile can easily be generated by entering a code indicative of the user when a program is preset for timer recording or a program is specified as a preferred program.

FIG. 10 shows an example of a user profile obtained by the user taste learning process. The data in the example shown in FIG. 10 are produced by processing the theme points of the programs shown in FIG. 6 according to the processing sequence shown in FIG. 8, from the state where no user's taste is learned, i.e., the state where all the theme points PR (Tj) of the profile are 0. The theme points are accumulated as shown in FIG. 10.

A processing sequence carried out by recommended program determining means 125 to determine a recommended program that meets the user's taste based on user profile 129 will be described below with reference to FIG. 9.

A recommended program is set to be determined in step 221, and the level of recommendation R (Pi) for a program Pi which is one of programs to be recommended is initialized to 0 in step 222. Then, a theme point K (Pi, Tj) of the program Pi with respect to a theme Tj in question is calculated by theme classifying means 128 in step 233, and the product of the theme point PR (Tj) in the profile and the theme point K (Pi, Tj) is added to the level of recommendation R (Pi) in step 224.

It is determined whether the level of recommendation R (Pi) is calculated for all the themes or not in step 225. Steps 223, 224 are repeated until the level of recommendation R (Pi) is calculated for all the themes, thereby determining the final level of recommendation R (Pi).

It is determined whether the final level of recommendation R (Pi) is determined for all the programs to be recommended or not in step 226.

Steps 222 through 225 are repeated until the final level of recommendation R (Pi) is determined for all the programs to be recommended. After the final level of recommendation R (Pi) is obtained for all the programs, the programs to be recommended are sorted in the descending order of levels of recommendation R (Pi). N programs of higher levels of recommendation R (Pi) are determined as recommended programs in step 227 where n may be "10" or may be a maximum number that can be displayed as recommended programs.

For example, if the level of recommendation R (Pi) for a program having theme points shown in FIG. 11 is calculated with respect to the user profile shown in FIG. 10, then the products of points of the themes "science" and "nature" are totaled as follows:

Level of recommendation R (Pi)=3 [point of the theme "science" in the user profile]×2 [point of the theme "science" in the program]+2 [point of the theme "nature" in the user profile]×1 [point of the theme "nature" in the program]=8

Figure 9:
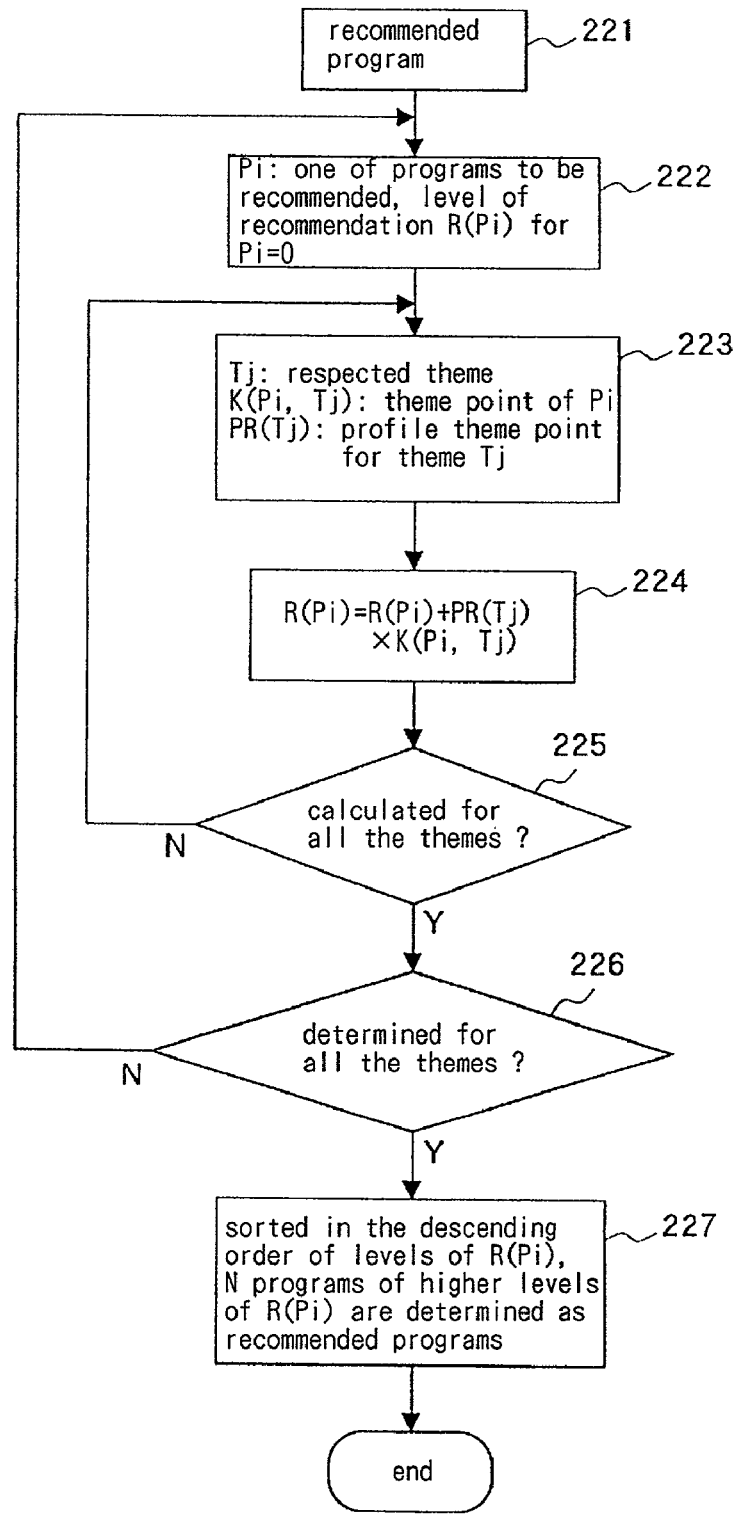
FIG. 9 is a flowchart of a processing sequence carried out by a recommended program determining means to determine a recommended program that meets the user's taste based on a user profile.

According to the processing sequence shown in FIG. 9, a program whose theme points with respect to themes of higher points in the user profile are higher has a higher level of recommendation. The user profile represents the user's taste in terms of points. Since a program matching the distribution of points in the user profile is selected as a recommended program, the program that meets the user's taste from the standpoint of theme classification is recommended.

The processing sequences of the user's taste learning process and the program recommending process are carried out very simply by user profile calculations based on accumulation and addition of theme points and the product and sum of program theme points. However, the present invention is not limited to this process, but may use a more sophisticated process such as Bayesian estimation which is widely used in pattern recognition or text matching.

Figure 12:
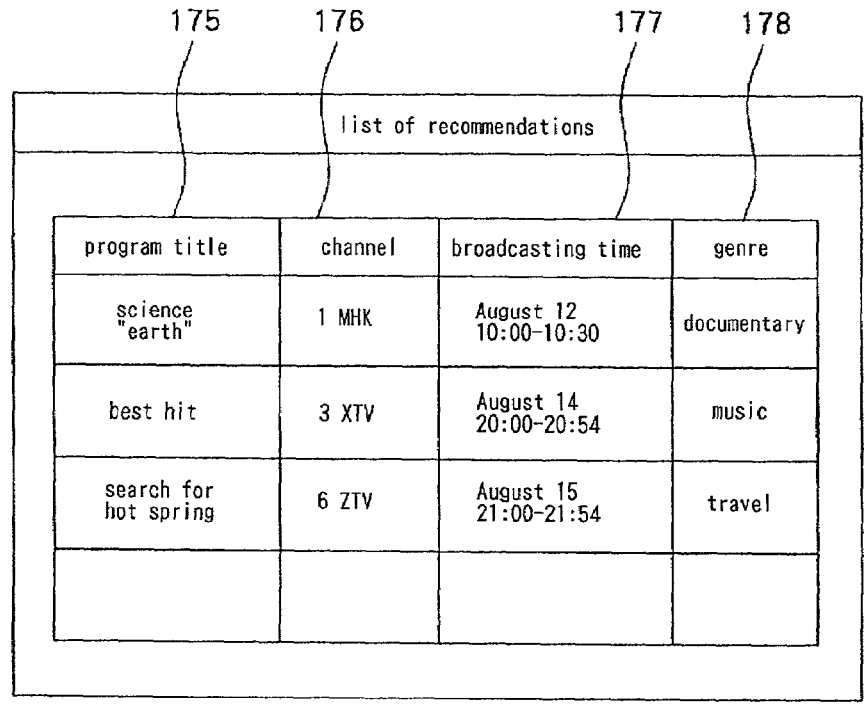
FIG. 12 is a diagram showing a displayed view output by a recommended program display means which presents recommended programs to the user.

FIG. 12 shows an example of a displayed view output by recommended program display means 124 which presents recommended programs to the user. In the illustrated example, a list of recommended programs having higher levels of recommendation is displayed in columns including program title 175, channel 176, broadcasting time 177, and genre 178.

Figure 13:
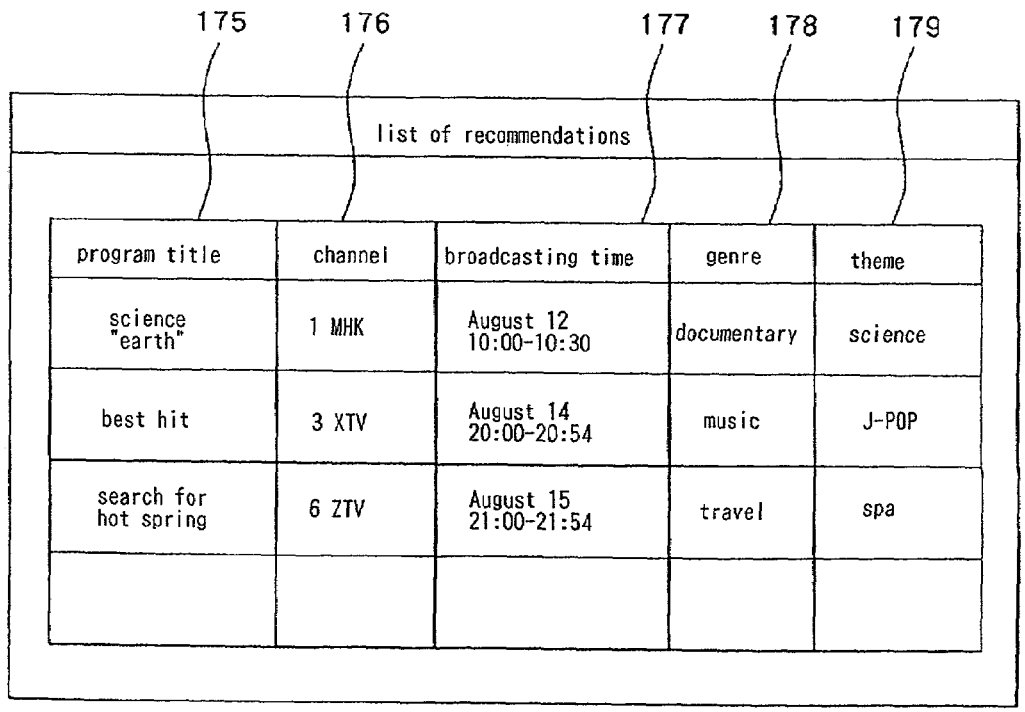
FIG. 13 is a diagram showing another displayed view output by the recommended program display means which presents recommended programs to the user.

FIG. 13 shows another example of a displayed view output by recommended program display means 124. In the illustrated example, a list of recommended programs having higher levels of recommendation is displayed in columns including those shown in FIG. 12 and also theme 147 which displays the names of themes that have greatly contributed to the recommendation of the programs. The displayed names of the themes are the names of themes Tj where the value of the product PR (Tj)×K (Pi, Tj) of the theme points of the programs Pi is highest in the calculation in step 224 shown in FIG. 9. The displayed names of the themes allow the user to guess the contents of the programs because the user understands the reason why the programs are recommended.

In FIGS. 12 and 13, one of the recommended programs in the displayed list may be preset for timer recording by program timer recording means 122.

The present invention offers a first advantage that since the user's taste is learned as a taste for program themes, programs can be recommended in a flexible manner where a conventional keyword learning process has failed. This is because explanations of the programs are analyzed to calculate theme points using dictionaries containing themes and keywords contained in the themes, and the theme points are learned as user's taste.

The present invention offers a second advantage that since meaningless words and abstract words can be excluded by classifying themes using only keywords contained in theme dictionaries, programs can be recommended with high accuracy. Furthermore, because the point of one theme can be increased by hitting other keywords than keywords belonging to several themes, the vagueness of general nouns is precluded.

While preferred embodiments of the present invention have been described using specific terms, such description is for illustrative purposes only, and it is to be understood that changes and variations may be made without departing from the spirit or scope of the appended claims.

What is claimed is:

1. A method of recommending a program in an apparatus which receives broadcasts of programs together with information representing contents of the programs, comprising the steps of:
    generating a user profile having a plurality of themes with numerical values assigned thereto for representing preferred programs of the user;
    determining a theme point for each of said themes for each of a plurality of programs, by assigning numerical values to each of said themes with respect to each of said programs, using a different theme dictionary associated with each theme, the theme dictionaries containing keywords given to each of said themes; and
    determining programs to be recommended from the numerical values assigned to the themes of said user profile and from the numerical values assigned to the themes with respect to each of the programs, wherein,
    said step of determining programs to be recommended comprises, for each of the programs, multiplying the numerical value assigned to each theme, from determining the theme point, with the numerical value assigned to the corresponding theme in the user profile, and the sum of said multiplication is used as a level of recommendation for each respective program.

2. A method according to claim 1, wherein said user profile is generated by classifying themes with respect to programs which have been preset in the past for timer recording by the user or programs which have been specified as preferred programs by the user, said classification being based on comparing keywords given to the themes from the information representing the contents of the programs.

3. A method according to claim 1, wherein themes are classified for generating said user profile, using unique numbers of keywords in the theme dictionaries contained in the information representing the contents of the programs, as points in the themes of the programs.

4. A method according to claim 1,
    wherein themes are classified for generating said user profile, using the total numbers of keywords in the theme dictionaries contained in the information representing contents of the programs, as points in the themes of the programs.

5. A method according to claim 1, further comprising the step of:
    displaying a list of recommended programs together with the titles of themes most contributed to the recommendation of the programs.

6. A method according to claim 1, further comprising the step of:
    individually generating a user profile of each of a plurality of users.

7. A method according to claim 1, wherein the information representing contents of the programs comprises EPG data.

8. A system for recommending a program in an apparatus which receives broadcasts of programs together with information representing contents of the programs, comprising:
    user's taste learning means for generating a user profile having a plurality of themes with numerical values assigned thereto for representing preferred programs of the user, and classifying themes by assigning numerical values to a plurality of respective themes with respect to each of a plurality of programs, using theme dictionaries containing keywords given to the themes, each theme have a different theme dictionary; and
    recommended program determining means for determining programs to be recommended from the numerical values assigned to the themes of said user profile and from the numerical values assigned to the themes with respect to the classification of each of the programs, wherein,
    said recommended program determining means adds products of numerical values assigned to themes in the user profiles and the numerical values assigned to the corresponding themes of the programs, and uses the sum as a level of recommendation.

9. A system according to claim 8, wherein said user's taste learning means generates said user profile by classifying themes with respect to programs which have been preset in the past for timer recording by the user or programs which have been specified as preferred programs by the user, said classification being based on comparing keywords given to the themes to the information representing the contents of the programs.

10. A system according to claim 8, wherein themes are classified for generating said user profile with said user's taste learning means, using unique numbers of keywords in the theme dictionaries contained in the information representing the contents of the programs, as points in the themes of the programs.

11. A system according to claim 8, wherein themes are classified for generating said user profile with said user's taste learning means, using the total numbers of keywords in the theme dictionaries contained in the information representing contents of the programs, as points in the themes of the programs.

12. A system according to claim 8, wherein said recommended program determining means displays a list of recommended programs together with the titles of themes most contributed to the recommendation of the programs.

13. A system according to claim 8, wherein said user's taste learning means individually generates a user profile of each of a plurality of users.

14. A system according to claim 8, wherein the information representing contents of the programs comprises EPG data.

* * * * *